(12) United States Patent
Mori

(10) Patent No.: US 9,403,222 B2
(45) Date of Patent: Aug. 2, 2016

(54) METHOD OF REMOVING END-SURFACE BURR OF FORMED GROOVE AND FORMED ROTARY CUTTING TOOL FOR CHAMFERING

(75) Inventor: Kosuke Mori, Toyokawa (JP)

(73) Assignee: OSG CORPORATION, Toyokawa-shi (JP)

( * ) Notice: Subject to any disclaimer, the term of this patent is extended or adjusted under 35 U.S.C. 154(b) by 541 days.

(21) Appl. No.: 13/990,471

(22) PCT Filed: Dec. 2, 2010

(86) PCT No.: PCT/JP2010/071611
§ 371 (c)(1),
(2), (4) Date: May 30, 2013

(87) PCT Pub. No.: WO2012/073374
PCT Pub. Date: Jun. 7, 2012

(65) Prior Publication Data
US 2013/0251472 A1    Sep. 26, 2013

(51) Int. Cl.
*B23C 3/12* (2006.01)
*B23C 3/30* (2006.01)
(Continued)

(52) U.S. Cl.
CPC ... *B23C 3/12* (2013.01); *B23C 3/30* (2013.01); *B23C 5/10* (2013.01); *B23C 5/14* (2013.01); *B23C 2210/088* (2013.01); *B23C 2220/16* (2013.01); *B23C 2220/20* (2013.01); *B23C 2220/366* (2013.01); *B23C 2220/48* (2013.01); *Y10T 407/1948* (2015.01); *Y10T 409/303808* (2015.01)

(58) Field of Classification Search
CPC ............ B23C 2220/16; B23C 2220/20; B23C 2220/366; B23C 3/12; B23C 3/126; B23C 3/16; B23C 3/18; B23C 3/28; B23C 3/30; B23C 5/12; B23C 5/14; B23C 2210/242; B23C 2210/247; B23C 2210/248; B23C 2215/44; B23C 2215/045; B23C 2215/52; B23C 2215/56; Y10T 409/303808
USPC ................... 409/132, 138; 407/53–54, 61–62
See application file for complete search history.

(56) References Cited

U.S. PATENT DOCUMENTS

| | | | | |
|---|---|---|---|---|
| 6,322,296 | B1 | 11/2001 | Wetli et al. | |
| 8,511,949 | B2 * | 8/2013 | Itoh | B23C 3/24 407/115 |
| 8,973,264 | B2 * | 3/2015 | Barnat | B23C 3/30 29/558 |

FOREIGN PATENT DOCUMENTS

| | | |
|---|---|---|
| CN | 1259413 A | 7/2000 |
| JP | A-2000-254812 | 9/2000 |

(Continued)

OTHER PUBLICATIONS
Machine translation of JP 2008-279547, printed Nov. 2015.*
(Continued)

*Primary Examiner* — Daniel Howell
(74) *Attorney, Agent, or Firm* — Oliff PLC

(57) ABSTRACT

A method of removing an end-surface burr of a formed groove cut into a workpiece by rotationally driving around an axial center and moving a formed rotary cutting tool relative to the workpiece in a direction orthogonal to the axial center, by using a formed rotary cutting tool for chamfering acquired by deforming a radial shape of the formed rotary cutting tool used in cutting of the formed groove according to a predefined chamfer angle, and by rotationally driving around an axial center and moving the formed rotary cutting tool for chamfering relative to an end surface of the formed groove in a direction perpendicular to the axial center along an axial center movement locus forming the chamfer angle relative to an axial center movement locus of the formed rotary cutting tool in the cutting of the formed groove, chamfering for removing a burr on the end surface is performed.

3 Claims, 10 Drawing Sheets

(51) Int. Cl.
*B23C 5/10* (2006.01)
*B23C 5/14* (2006.01)

(56) References Cited

FOREIGN PATENT DOCUMENTS

| JP | 2000326133 A | * | 11/2000 |
| JP | A-2001-1206 | | 1/2001 |
| JP | 3626878 B2 | | 3/2005 |
| JP | A-2007-276010 | | 10/2007 |
| JP | 2008279547 A | * | 11/2008 |
| JP | 2008279548 A | * | 11/2008 |
| JP | 2010158762 A | * | 7/2010 |

OTHER PUBLICATIONS

Dec. 28, 2010 International Search Report issued in Application No. PCT/JP2010/071611 (with translation).

Nov. 25, 2014 Chinese Office Action issued in Chinese Patent Application No. 201080070432.X.

* cited by examiner

MACHINED END SURFACE (OBTUSE ANGLE SIDE)

MACHINED END SURFACE (OBTUSE ANGLE SIDE)

METHOD OF REMOVING END-SURFACE BURR OF FORMED GROOVE AND FORMED ROTARY CUTTING TOOL FOR CHAMFERING

TECHNICAL FIELD

The present invention relates to a method of removing an end-surface burr of a formed groove and a formed rotary cutting tool for chamfering and particularly to improvement for realizing uniform chamfering with a simple machine operation in a shorter time.

BACKGROUND ART

Mounting structures for mounting a turbine wheel of a steam turbine etc., to a rotating shaft include a structure in which blades 14 of a turbine wheel are fitted one-by-one to a multiplicity of tree-shaped grooves 12 formed in an outer circumferential portion of a rotating shaft 10 as depicted in FIG. 14. FIG. 15 is an enlarged perspective view of the tree-shaped groove 12, which is symmetrical relative to a groove center S with a groove width smoothly increasing/decreasing and gradually narrowing in a groove depth direction (toward the lower side of FIG. 15) like an inverted Christmas tree such that pluralities of concave portions 18 and convex portions 20 are alternately and serially disposed on both side surfaces 16a and 16b.

Cutting of the tree-shaped groove 12 as described above is performed by, for example, rotationally driving around an axial center and moving a formed rotary cutting tool corresponding to the shape of the tree-shaped groove 12, i.e., a so-called Christmas tree formed milling cutter relative to a workpiece in a direction orthogonal to the axial center, and burrs 22 are normally generated at the time of the cutting on an end surface of the tree-shaped groove 12 as indicated by a shaded area in FIG. 16. Since no means conventionally exist for removing the burrs 22 through a machine operation, the burrs 22 are manually removed by humans, resulting in adverse effects such as very long working hours and requirements of skills of workers. Thus, a technique is proposed that enables mechanization of rounding (chamfering) of a groove having an inclined groove surface as in the tree-shaped groove 12. For example, this corresponds to a disk parts machining device described in Patent Document 1.

PRIOR ART DOCUMENT

Patent Document

Patent Document 1: Japanese Laid-Open Patent Publication No. 2001-1206

SUMMARY OF THE INVENTION

Problems to be Solved by the Invention

However, although the conventional technique realizes mechanization of removal of an end-surface burr of a formed groove formed on a workpiece, since a tool rotation axis in the cutting of, for example, a formed groove such as a tree-shaped groove must be orthogonal to a tool rotating axis in the burr removal work of the formed groove, a cutting tool for the burr removal work must be attached to a machine different from a machine related to the cutting of the formed groove and the machines must be switched for the machining unless a machine spindle or a workpiece can be rotated 90 degrees. In the conventional technique, the machining must be performed while a shape of a groove surface to be machined is measured point-by-point and working hours cannot be reduced partially because a longer time is required for the measurement and positioning. Even in the case of the machine operation, positioning corresponding to measured positional information is required and, therefore, the adverse effects, i.e., the requirements of the skills of workers, remain unresolved. In other words, a method of removing an end-surface burr of a formed groove and a formed rotary cutting tool for chamfering realizing uniform chamfering with a simple machine operation in a shorter time are not yet developed in the present circumstances.

The present invention was conceived in view of the situations and it is therefore an object of the present invention to provide a method of removing an end-surface burr of a formed groove and a formed rotary cutting tool for chamfering realizing uniform chamfering with a simple machine operation in a shorter time.

Means for Solving the Problem

To achieve the object, a first aspect of the invention provides a method of removing an end-surface burr of a formed groove cut into a workpiece by rotationally driving around an axial center and moving a formed rotary cutting tool relative to the workpiece in a direction orthogonal to the axial center, wherein by using a formed rotary cutting tool for chamfering acquired by deforming a radial shape of the formed rotary cutting tool used in cutting of the formed groove in accordance with a predefined chamfer angle, and by rotationally driving around an axial center and moving the formed rotary cutting tool for chamfering relative to an end surface of the formed groove in the direction orthogonal to the axial center along an axial center movement locus forming the chamfer angle relative to an axial center movement locus of the formed rotary cutting tool in the cutting of the formed groove, chamfering for removing a burr on the end surface is performed.

In addition, to achieve the object, a second aspect of the invention provides a formed rotary cutting tool for chamfering used for removing an end-surface burr of a formed groove cut into a workpiece by rotationally driving around an axial center and moving a formed rotary cutting tool relative to the workpiece in a direction orthogonal to the axial center, the formed rotary cutting tool for chamfering being acquired by deforming a radial shape of the formed rotary cutting tool used in cutting of the formed groove in accordance with a predefined chamfer angle, the formed rotary cutting tool for chamfering being used in chamfering for removing a burr on an end surface by rotationally driving around an axial center and moving the formed rotary cutting tool for chamfering relative to the end surface of the formed groove in a direction perpendicular to the axial center along an axial center movement locus forming the chamfer angle relative to an axial center movement locus of the formed rotary cutting tool in the cutting of the formed groove.

Effects of the Invention

As described above, according to the first aspect of the invention, by using a formed rotary cutting tool for chamfering acquired by deforming a radial shape of the formed rotary cutting tool used in cutting of the formed groove in accordance with a predefined chamfer angle, and by rotationally driving around an axial center and moving the formed rotary cutting tool for chamfering relative to an end surface of the formed groove in a direction orthogonal to the axial center along an axial center movement locus forming the chamfer angle relative to an axial center movement locus of the formed rotary cutting tool in the cutting of the formed groove, chamfering for removing a burr on the end surface is performed. Therefore, the burr removal work can be mechanized by the same machine as the machine related to the cutting of the formed groove while the standardized simple operation enables shortening of working hours and unmanned operation without requiring skills of workers. Thus, the method of removing an end-surface burr of a formed groove can be provided to realize uniform chamfering with a simple machine operation in a shorter time.

According to the second aspect of the invention, the formed rotary cutting tool for chamfering is acquired by deforming a radial shape of the formed rotary cutting tool used in cutting of the formed groove in accordance with a predefined chamfer angle, and is used in chamfering for removing a burr on an end surface by rotationally driving around an axial center and moving the formed rotary cutting tool for chamfering relative to the end surface of the formed groove in a direction perpendicular to the axial center along an axial center movement locus forming the chamfer angle relative to an axial center movement locus of the formed rotary cutting tool in the cutting of the formed groove. Therefore, the burr removal work can be mechanized by the same machine as the machine related to the cutting of the formed groove while the standardized simple operation enables shortening of working hours and unmanned operation without requiring skills of workers. Thus, the formed rotary cutting tool for chamfering can be provided that realizes uniform chamfering with a simple machine operation in a shorter time.

In the first to second aspects of the invention, preferably, a radial shape f(x) corresponding to an axial position x of the formed rotary cutting tool for chamfering is expressed by the following equation (1), where $f_{base}(x)$ is a radial shape corresponding to the axial position x of the formed rotary cutting tool used in the cutting of the formed groove, θ is the chamfer angle, and α is an inclination angle of the formed groove direction relative to a perpendicular line to the end surface. Note that g(α,θ) in the equation (1) is expressed by the following equation (2) if a portion to be chamfered is located on an acute angle side, and is expressed by the following equation (3) if a portion to be chamfered is located on an obtuse angle side. Consequently, the practical formed rotary cutting tool for chamfering preferably used for the end-surface burr removal work of the formed groove can be provided.

$$f(x) = f_{base}(x) \times \cos\theta \times g(\alpha,\theta) \quad (1)$$

$$g(\alpha,\theta) = 1 + \tan\alpha \times \tan\theta \quad (2)$$

$$g(\alpha,\theta) = 1 - \tan\alpha \times \tan\theta \quad (3)$$

MODES FOR CARRYING OUT THE INVENTION

Figure 1:
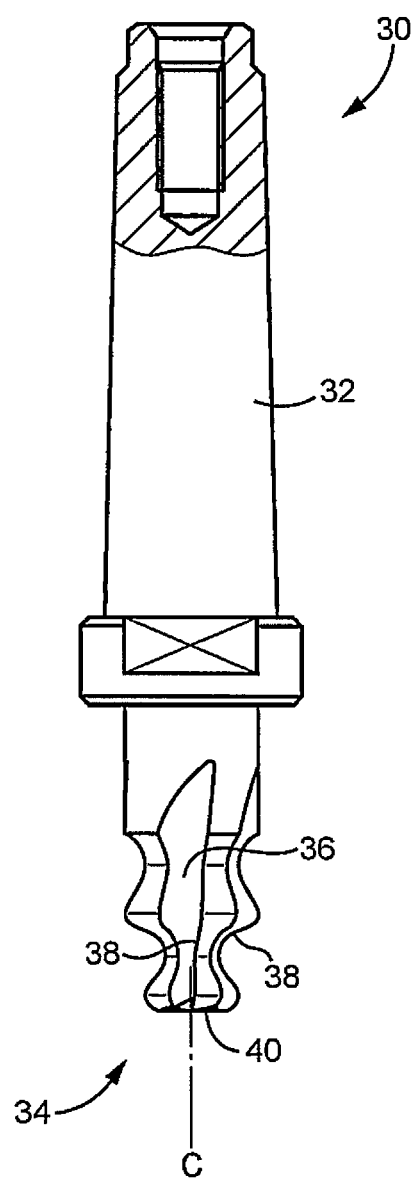
FIG. 1 is a partially cutaway front view of a Christmas tree formed milling cutter that is an example of a formed rotary cutting tool cutting a formed groove to which a method of removing an end-surface burr of the present invention is preferably applied when viewed in a direction perpendicular to an axial center.

The present invention is preferably applied to, for example, removal work of an end-surface burr and chamfering in an arbitrary size for a concave-convex groove having a concave-convex portion on a side surface, a tree-shaped groove in an inverted Christmas tree shape, etc., and is also widely applied to the removal work of an end-surface burr of a formed groove cut into a workpiece by rotationally driving around an axial center and moving a formed rotary cutting tool relative to the workpiece in a direction orthogonal to the axial center.

A chamfer angle θ in the present invention is defined in advance depending on a shape of a formed groove to be chamfered, an inclination angle α of a formed-groove direction relative to a perpendicular line to an end surface, etc., and determines an axial center movement locus of a formed rotary cutting tool for chamfering at the time of the chamfering. The inclination angle α is preferably set within a range of 0 degrees or greater to 60 degrees or less as appropriate. For the chamfer angle θ, a preferred angle range is defined depending on the inclination angle α such that, for example, in the case of chamfering of a formed groove having the inclination angle α=0 degrees, i.e., having the formed-groove direction perpendicular to the end surface, the chamfer angle θ is within a range of 5 degrees or greater to 85 degrees or less. In other words, preferably, if a portion to be chamfered is located on the acute angle side, i.e., a portion with an acute angle formed by the formed-groove direction relative to the end surface is chamfered, the chamfer angle θ is set within a range of 5 (degrees) or greater to 85+α (degrees) or less, and if a portion to be chamfered is located on the obtuse angle side, i.e., a portion with an obtuse angle formed by the formed-groove direction relative to the end surface is chamfered, the chamfer angle θ is set within a range of 5 (degrees) or greater to 85−α (degrees) or less.

The formed rotary cutting tool for chamfering of the present invention is acquired by deforming a radial shape of the formed rotary cutting tool used in cutting of a target formed groove in accordance with a predefined chamfer angle. Therefore, the formed rotary cutting tool for chamfering is a separate tool designed and created correspondingly to the formed rotary cutting tool used in the cutting of the target formed groove and is preferably a dedicated chamfering tool for the formed rotary cutting tool. Preferably, this formed rotary cutting tool for chamfering is attached to a cutting machine cutting a workpiece by rotationally driving around an axial center and moving the formed rotary cutting tool relative to the workpiece in the direction orthogonal to the axial center and is rotatably driven around an axial center and moved relative to the workpiece along an axial center movement locus different from the formed rotary cutting tool by the cutting machine so as to perform chamfering for removing a burr on an end surface.

A radial shape f(x) corresponding to an axial position x of the formed rotary cutting tool for chamfering is expressed by the equation (1), where $f_{base}(x)$ is a radial shape corresponding to the axial position x of the formed rotary cutting tool used in the cutting of the formed groove, θ is the chamfer angle, and α is an inclination angle of the formed groove direction relative to a perpendicular line to the end surface. In the equation (1), g(α,θ) is expressed by the equation (2) if a portion to be chamfered is located on the acute angle side, and is expressed by the equation (3) if a portion to be chamfered is located on the obtuse angle side. The portion to be chamfered located on the acute angle side corresponds to chamfering of a portion with an acute angle formed between the formed-groove direction (extension direction of a groove inner circumferential surface) and the end-surface direction, and the portion to be chamfered located on the obtuse angle side corresponds to chamfering of a portion with an obtuse angle formed between the formed-groove direction and the end-surface direction. Therefore, preferably, separate formed rotary cutting tools for chamfering are respectively prepared for the chamfering on the acute angle side and the chamfering on the obtuse angle side.

When the inclination angle α of the formed-groove direction relative to the perpendicular line to the end surface is zero, i.e., if the formed-groove direction is perpendicular to the end surface, g(α,θ)=1 is satisfied and, therefore, the radial shape f(x) corresponding to the axial position x of the formed rotary cutting tool for chamfering is expressed by the following equation (4), where $f_{base}(x)$ is a radial shape corresponding to the axial position x of the formed rotary cutting tool used in the cutting of the formed groove and θ is the chamfer angle.

$$f(x)=f_{base}(x)\times\cos\theta \quad (4)$$

Embodiment

A preferred embodiment of the present invention will now be described in detail with reference to the drawings. FIG. 1 is a partially cutaway front view of a Christmas tree formed milling cutter 30 that is an example of a formed rotary cutting tool cutting a formed groove to which a method of removing an end-surface burr of the present invention is preferably applied when viewed in a direction perpendicular to an axial center. The Christmas tree formed milling cutter 30 depicted in FIG. 1 is a formed rotary cutting tool used for cutting of a tree-shaped groove 52 described later with reference to FIG. 3, is attached at a shank 32 to a drive shaft of a cutting machine not depicted, and is rotatably driven around the axial center and moved by the cutting machine relative to a workpiece (a workpiece 50 in an example depicted in FIG. 3) in a direction orthogonal to the axial center for cutting of the tree-shaped groove 52 as depicted in FIG. 3.

As depicted in FIG. 1, the Christmas tree formed milling cutter 30 integrally includes the shank 32 and a cutting portion 34 and the cutting portion 34 forms a shape of an inverted Christmas tree corresponding to a concave-convex shape of the tree-shaped groove 52 described later with reference to FIG. 3. Specifically, the cutting portion 34 is configured with a radial dimension smoothly increasing/decreasing and gradually narrowing to a smaller diameter toward a tool tip (the lower side of FIG. 1). The cutting portion 34 is disposed with a plurality of (e.g., four) chip discharging grooves 36 at regular angular intervals around an axial center C and is disposed with a plurality of outer peripheral cutting edges 38 along the chip discharging grooves 36 and a bottom cutting edge 40 continuous with the outer peripheral cutting edges 38. The outer peripheral cutting edges 38 and the bottom cutting edge 40 correspond to cutting edges rotationally driven clockwise for cutting work when the Christmas tree formed milling cutter 30 is viewed from the shank 32 and the chip discharging grooves 36 are inclined clockwise at a predetermined helix angle.

Figure 2:
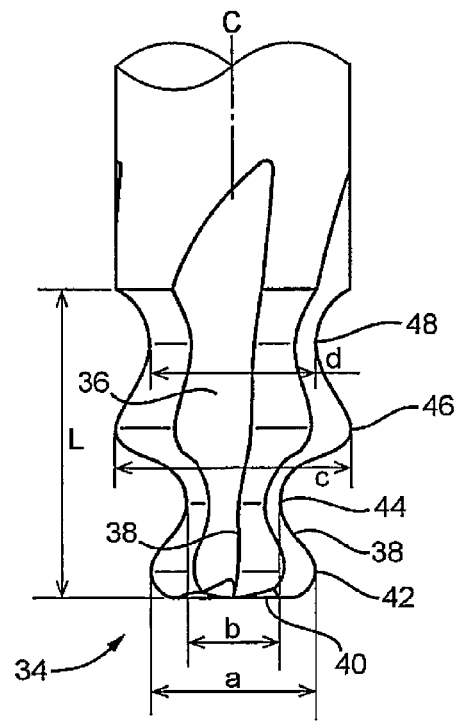
FIG. 2 is an enlarged view of a cutting portion for explaining a configuration of the cutting portion of the Christmas tree formed milling cutter depicted in FIG. 1 in detail.

FIG. 2 is an enlarged view of the cutting portion 34 for explaining a configuration of the cutting portion 34 of the Christmas tree formed milling cutter 30 in detail. As depicted in FIG. 2, the cutting portion 34 has a first large diameter portion 42, a first small diameter portion 44, a second large diameter portion 46, and a second small diameter portion 48 formed in this order from the tool tip toward the shank 32. In FIG. 2, a denotes a radial dimension of the first large diameter portion 42; b denotes a radial dimension of the first small diameter portion 44; c denotes a radial dimension of the second large diameter portion 46; and d denotes a radial dimension of the second small diameter portion 48. As described above, the cutting portion 34 of the Christmas tree formed milling cutter 30 is configured with a radial dimension smoothly increasing/decreasing and gradually narrowing to a smaller diameter toward the tool tip, and the radial dimension of the first large diameter portion 42 is smaller than the second large diameter portion 46 while the radial dimension of the first small diameter portion 44 is smaller than the second small diameter portion 48. Therefore, the radial dimensions depicted in FIG. 2 satisfy a<c and b<d. The radial dimensions a to d correspond to the respective local maximum values of the radial dimensions of the first large diameter portion 42 and the second large diameter portion 46 and the respective local minimum values of the radial dimensions of the first small diameter portion 44 and the second small diameter portion 48 and, in other words, correspond to radial dimensions at the portions of local maximums and local minimums of the diameter (radius) of the radial shape of the cutting portion 34 configured with a radial dimension smoothly increasing/decreasing and gradually narrowing to a smaller diameter toward the tool tip.

Figure 3:
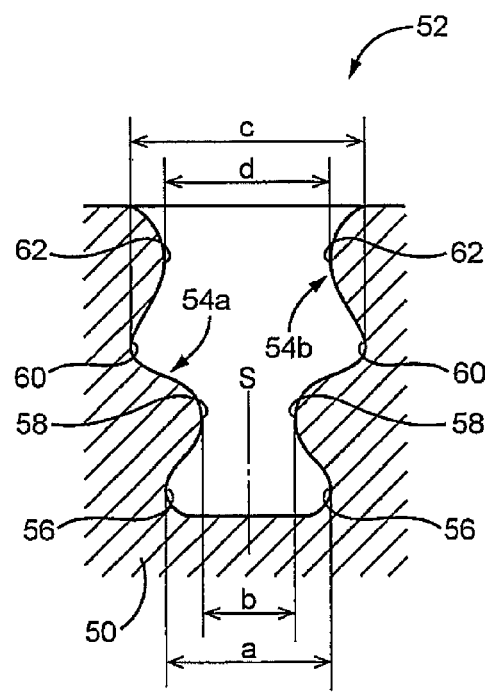
FIG. 3 is a cross-sectional view of a tree-shaped groove that is an example of a formed groove cut into a workpiece by the Christmas tree formed milling cutter depicted in FIG. 1.

FIG. 3 is a cross-sectional view of the tree-shaped groove 52 that is an example of a formed groove cut into the workpiece 50 by the Christmas tree formed milling cutter 30. As depicted in FIG. 3, the tree-shaped groove 52 is cut into the workpiece 50 by rotationally driving around an axial center C and moving the Christmas tree formed milling cutter 30 relative to the workpiece 50 in the direction orthogonal to the axial center C and is symmetrical relative to a groove center S with a groove width smoothly increasing/decreasing and gradually narrowing in a groove depth direction (toward the lower side of FIG. 3) like an inverted Christmas tree such that a first concave portion 56, a first convex portion 58, a second concave portion 60, and a second convex portion 62 are alternately and serially disposed in this order from the bottom to the opening of the groove on both side surfaces 54a and 54b. In FIG. 3, a denotes a width dimension between the first concave portions 56 formed on the both side surfaces 54a and 54b; b denotes a width dimension between the first convex portions 58; c denotes a width dimension between the second concave portions 60; and d denotes a width dimension between the second convex portions 62.

As depicted in FIGS. 2 and 3, the cross-sectional shape of the tree-shaped groove 52 cut into the workpiece 50 by the Christmas tree formed milling cutter 30 corresponds to the cross-sectional shape including the axial center C of the cutting portion 34 of the Christmas tree formed milling cutter 30. Specifically, the first concave portions 56 on the both side surfaces 54 of the tree-shaped groove 52 are formed correspondingly to the first large diameter portion 42 of the cutting portion 34; the first convex portions 58 are formed correspondingly to the first small diameter portion 44; the second concave portions 60 are formed correspondingly to the second large diameter portion 46; and the second convex portions 62 are formed correspondingly to the second small diameter portion 48. Therefore, the width dimension between the first concave portions 56 is equal to the radial dimension a of the first large diameter portion 42; the width dimension between the first convex portions 58 is equal to the radial dimension b of the first small diameter portion 44; the width dimension between the second concave portions 60 is equal to the radial dimension c of the second large diameter portion 46; and the width dimension between the second convex portions 62 is equal to the radial dimension d of the second small diameter portion 48. Although the radial dimensions a to d of the cutting portion 34 are not necessarily exactly identical to the width dimensions a to d of the tree-shaped groove 52 in actual cutting work, the dimensions have substantially equal values and are treated as substantially the same values in this embodiment.

Figure 4:
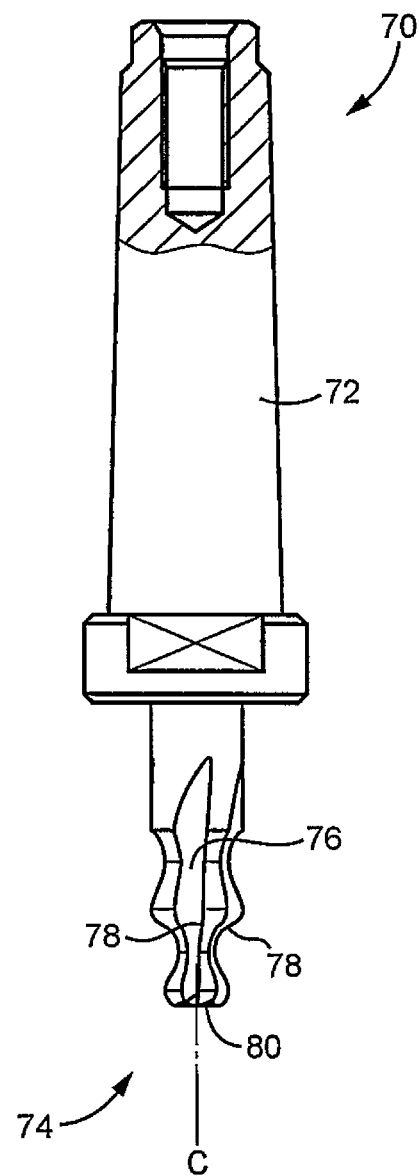
FIG. 4 is a partially cutaway front view of a tree-shaped groove chamfering tool that is one embodiment of a formed rotary cutting tool for chamfering of the present invention when viewed in a direction perpendicular to an axial center.

FIG. 4 is a partially cutaway front view of a tree-shaped groove chamfering tool 70 that is one embodiment of a formed rotary cutting tool for chamfering of the present invention when viewed in a direction perpendicular to an axial center. The tree-shaped groove chamfering tool 70 depicted in FIG. 4 is a formed rotary cutting tool for chamfering used in the chamfering for removing an end-surface burr generated by the cutting of the tree-shaped groove 52 described with reference to FIG. 3, is attached at a shank 72 to a drive shaft of a cutting machine not depicted, and is rotatably driven around the axial center and moved by the cutting machine relative to the tree-shaped groove 52 in the workpiece 50 in a direction orthogonal to the axial center so as to perform the chamfering for removing an end-surface burr on the tree-shaped groove 52. The shank same as the shank 32 of the Christmas tree formed milling cutter 30 is preferably used for the shank 72.

As depicted in FIG. 4, the tree-shaped groove chamfering tool 70 integrally includes the shank 72 and a cutting portion 74 and the cutting portion 74 forms a shape of an inverted Christmas tree as is the case with the cutting portion 34 of the Christmas tree formed milling cutter 30. Specifically, the cutting portion 74 is configured with a radial dimension smoothly increasing/decreasing and gradually narrowing to a smaller diameter toward a tool tip (the lower side of FIG. 4). The cutting portion 74 is disposed with a plurality of (e.g., four) chip discharging grooves 76 at regular angular intervals around the axial center C and is disposed with a plurality of outer peripheral cutting edges 78 along the chip discharging grooves 76 and a bottom cutting edge 80 continuous with the outer peripheral cutting edges 78. The outer peripheral cutting edges 78 and the bottom cutting edge 80 correspond to cutting edges rotationally driven clockwise for cutting work when the tree-shaped groove chamfering tool 70 is viewed from the shank 72 and the chip discharging grooves 76 are inclined clockwise at a predetermined helix angle.

Figure 5:
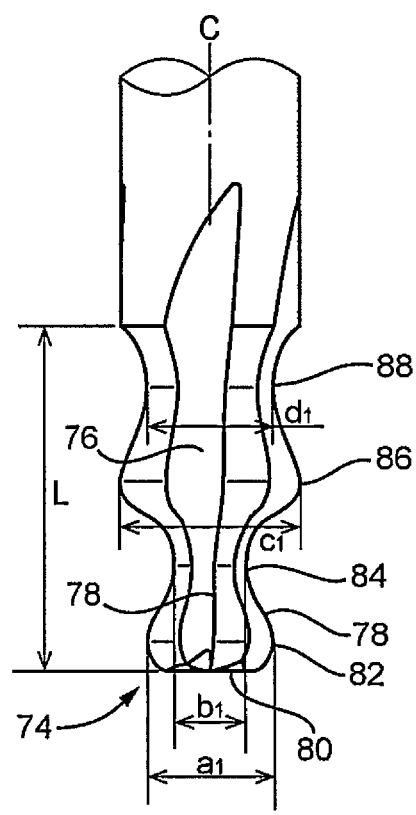
FIG. 5 is an enlarged view of the cutting portion for explaining a configuration of a cutting portion of the tree-shaped groove chamfering tool depicted in FIG. 4 in detail.

FIG. 5 is an enlarged view of the cutting portion 74 for explaining a configuration of the cutting portion 74 of the tree-shaped groove chamfering tool 70 in detail. As depicted in FIG. 5, the cutting portion 74 has a first large diameter portion 82, a first small diameter portion 84, a second large diameter portion 86, and a second small diameter portion 88 formed in this order from the tool tip toward the shank 72. In FIG. 5, $a_1$ denotes a radial dimension of the first large diameter portion 82; $b_1$ denotes a radial dimension of the first small diameter portion 84; $c_1$ denotes a radial dimension of the second large diameter portion 86; and $d_1$ denotes a radial dimension of the second small diameter portion 88. The radial dimensions $a_1$ to $d_1$ correspond to the respective local maximum values of the radial dimensions of the first large diameter portion 82 and the second large diameter portion 86 and the respective local minimum values of the radial dimensions of the first small diameter portion 84 and the second small diameter portion 88 and, in other words, correspond to radial dimensions at the portions of local maximums and local minimums of the diameter (radius) of the radial shape of the cutting portion 74 configured with a radial dimension smoothly increasing/decreasing and gradually narrowing to a smaller diameter toward the tool tip.

The cutting portion 74 of the tree-shaped groove chamfering tool 70 is acquired by deforming a radial shape of the cutting portion 34 of the Christmas tree formed milling cutter 30 used in the cutting of the tree-shaped groove 52 to be machined, in accordance with a predefined chamfer angle θ. Therefore, an axial dimension L of the cutting portion 74 of the tree-shaped groove chamfering tool 70 is equal to an axial dimension L of the cutting portion 34 of the Christmas tree formed milling cutter 30 (see FIG. 2) and the relative positions of the first large diameter portion 82, the first small diameter portion 84, the second large diameter portion 86, and the second small diameter portion 88 in the axial center direction are equal to the relative positions of the first large diameter portion 42, the first small diameter portion 44, the second large diameter portion 46, and the second small diameter portion 48 of the cutting portion 34 in the axial center direction. In other words, the portions of local maximum values and local minimum values of radial dimension are spaced equally in the axial center direction between the cutting portion 74 of the tree-shaped groove chamfering tool 70 and the cutting portion 34 of the Christmas tree formed milling cutter 30. On the other hand, a radial shape of the cutting portion 74 is different from a radial shape of the cutting portion 34 of the Christmas tree formed milling cutter 30 and is generally configured with a smaller diameter as compared to the cutting portion 34.

For example, a radial shape f(x) corresponding to an axial position x of the cutting portion 74 of the tree-shaped groove chamfering tool 70 is expressed by the following equation (1), where $f_{base}(x)$ is a radial shape corresponding to the axial position x of the cutting portion 34 of the Christmas tree formed milling cutter 30, $\theta$ is a chamfer angle; and $\alpha$ is an inclination angle of the direction of the tree-shaped groove 12 relative to the perpendicular line to the end surface. In the equation (1), $g(\alpha,\theta)$ is expressed by the following equation (2) if a portion to be chamfered is located on the acute angle side, and is expressed by the following equation (3) if a portion to be chamfered is located on the obtuse angle side. When the inclination angle $\alpha$ of the groove direction relative to the perpendicular line to the end surface is zero, i.e., if the groove direction is perpendicular to the end surface, $g(\alpha,\theta)=1$ is satisfied and, therefore, the radial shape f(x) corresponding to the axial position x of the cutting portion 74 is expressed by the following equation (4). The chamfer angle $\theta$, the inclination angle $\alpha$ of the groove direction relative to the perpendicular line to the end surface, and a difference between the cases of portions to be chamfered located on the acute angle side and the obtuse angle side will be described later with reference to FIGS. 6 and 7. In particular, although the tree-shaped groove chamfering tools 70 are preferably designed and prepared as respective separate tools for the chamfering on the acute angle side and the chamfering on the obtuse angle side, these tools are collectively depicted and described in FIGS. 4 and 5 in this embodiment.

$$f(x) = f_{base}(x) \times \cos\theta \times g(\alpha,\theta) \quad (1)$$

$$g(\alpha,\theta) = 1 + \tan\alpha \times \tan\theta \quad (2)$$

$$g(\alpha,\theta) = 1 - \tan\alpha \times \tan\theta \quad (3)$$

$$f(x) = f_{base}(x) \times \cos\theta \quad (4)$$

Considering the radial shape f(x) corresponding to the axial position x of the cutting portion 74 in the tree-shaped groove chamfering tool 70 along the equation (1) to (3), in the exemplary configurations depicted in FIGS. 2 and 4, the radial dimension $a_1$ of the first large diameter portion 82 in the cutting portion 74 is a value expressed by $a_1 = a \times \cos\theta \times g(\alpha,\theta)$, where a is the radial dimension of the first large diameter portion 42 in the cutting portion 34 of the Christmas tree formed milling cutter 30. The radial dimension $b_1$ of the first small diameter portion 84 in the cutting portion 74 is a value expressed by $b_1 = b \times \cos\theta \times g(\alpha,\theta)$, where b is the radial dimension of the first small diameter portion 44 in the cutting portion 34 of the Christmas tree formed milling cutter 30. The radial dimension $c_1$ of the second large diameter portion 86 in the cutting portion 74 is a value expressed by $c_1 = c \times \cos\theta \times g(\alpha,\theta)$, where c is the radial dimension of the second large diameter portion 46 in the cutting portion 34 of the Christmas tree formed milling cutter 30. The radial dimension $d_1$ of the second small diameter portion 88 in the cutting portion 74 is a value expressed by $d_1 = d \times \cos\theta \times g(\alpha,\theta)$, where d is the radial dimension of the second small diameter portion 48 in the cutting portion 34 of the Christmas tree formed milling cutter 30.

Although the correlations are representatively described between the portions of the local maximum values and local minimum values of the radial dimensions in the cutting portions 34 and 74, the other portions also have radial shapes satisfying the equations (1) to (3). For example, with regard to a portion smoothly continuing from the first large diameter portion 82 to the first small diameter portion 84 of the cutting portion 74, when $f(x_1)$, $f(x_2)$, $f(x_3)$, ... are radial shapes corresponding to axial positions $x_1, x_2, x_3, \ldots$ (not depicted) (i.e., radial dimensions corresponding to x), the radial shapes are expressed by $f(x_1) = f_{base}(x_1) \times \cos\theta \times g(\alpha,\theta)$, $f(x_2) = f_{base}(x_2) \times \cos\theta \times g(\alpha,\theta)$, $f(x_3) = f_{base}(x_3) \times \cos\theta \times g(\alpha,\theta)$, ... in accordance with the equations (1) to (3). For the radial shape f(x) corresponding to the axial position x of the cutting portion 74 in the tree-shaped groove chamfering tool 70, a profile is obtained by calculating the radial shape corresponding to the axial direction x of the cutting portion 34 in the Christmas tree formed milling cutter 30 based on the equations (1) to (3) in a continuous manner corresponding to $f_{base}(x)$ (or in a discrete manner using sampled values) and, as a result, the radial shape of the cutting portion 74 in the tree-shaped groove chamfering tool 70 is designed as a shape satisfying the equations (1) to (3).

Figure 6:
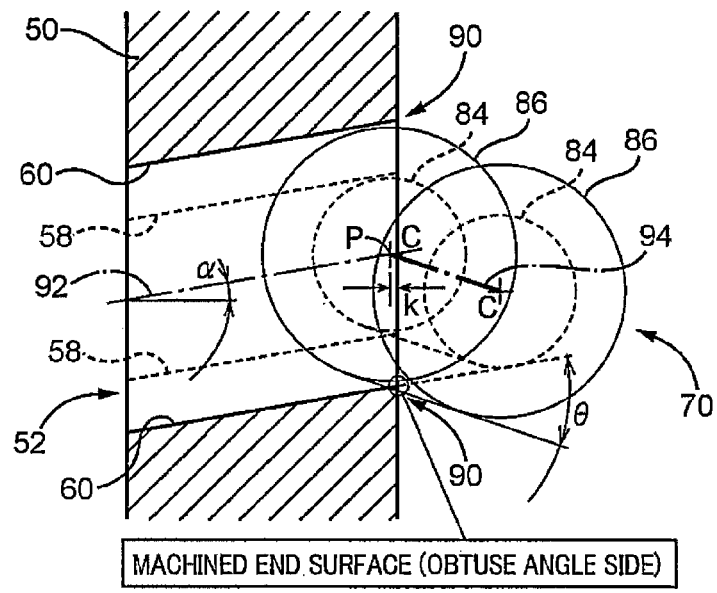
FIG. 6 is a schematic for explaining a method of removing a burr on the acute angle side of an end surface of a tree-shaped groove by the tree-shaped groove chamfering tool depicted in FIG. 4.
Figure 7:
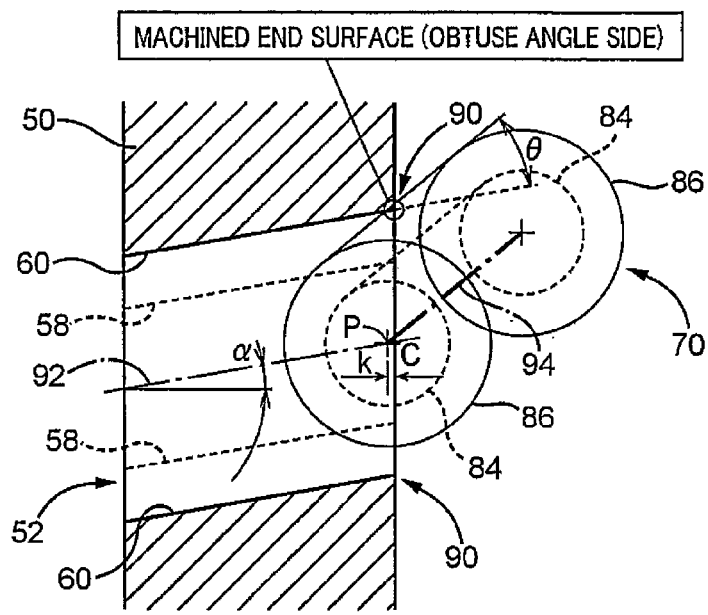
FIG. 7 is a schematic for explaining a method of removing a burr on the obtuse angle side of the end surface of the tree-shaped groove by the tree-shaped groove chamfering tool depicted in FIG. 4.

FIG. 6 is a schematic for explaining a method of removing a burr on the acute angle side of an end surface of the tree-shaped groove 52 by the tree-shaped groove chamfering tool 70. FIG. 7 is a schematic for explaining a method of removing a burr on the obtuse angle side of the end surface of the tree-shaped groove 52 by the tree-shaped groove chamfering tool 70. As depicted in FIG. 6, the burr removal on the acute angle side of the end surface of the tree-shaped groove 52 corresponds to chamfering of a portion with an acute angle formed between the groove direction and an end surface direction (a plane including an end surface 90) on the end surface 90 of the tree-shaped groove 52 when an extending direction of the tree-shaped groove 52 (groove direction) is inclined relative to the perpendicular line to the end surface 90 of the tree-shaped groove 52, i.e., when the inclination angle $\alpha$ of the groove direction relative to the perpendicular line to the end surface 90 is not zero. As depicted in FIG. 7, the burr removal on the obtuse angle side of the end surface of the tree-shaped groove 52 corresponds to chamfering of a portion with an obtuse angle formed between the groove direction and the end surface direction (the plane including the end surface 90) on the end surface 90 of the tree-shaped groove 52.

As depicted in FIGS. 6 and 7, in the method of removing a burr in this embodiment, the tree-shaped groove chamfering tool 70 is rotationally driven around the axial center and moved relative to the end surface 90 of the tree-shaped groove 52 in the direction perpendicular to the axial center C along an axial center movement locus 94 forming a predefined chamfer angle $\theta$ relative to an axial center movement locus 92 of the Christmas tree formed milling cutter 30 in the cutting of the tree-shaped groove 52, thereby performing the chamfering for removing the burr on the end surface 90. In FIGS. 6 and 7, the axial center movement locus 92 of the Christmas tree formed milling cutter 30 in the cutting of the tree-shaped groove 52 is indicated by a thin dashed-dotted line, and the axial center movement locus 94 of the tree-shaped groove chamfering tool 70 in the chamfering is indicated by a thick dashed-dotted line. As depicted in FIGS. 6 and 7, the axial center movement locus 94 of the tree-shaped groove chamfering tool 70 in the method of removing a burr in this embodiment is a linear locus that forms the chamfer angle θ relative to the axial center movement locus 92 of the Christmas tree formed milling cutter 30 in the cutting of the tree-shaped groove 52 and that intersects with the axial center movement locus 92 at an intersection point P located inward in the groove direction at a predetermined distance k from the end surface 90. The tree-shaped groove chamfering tool 70 may relatively be moved from the intersection point P to the outside of the tree-shaped groove 52 along the axial center movement locus 94 or may relatively be moved from the outside of the tree-shaped groove 52 to the intersection point P along the axial center movement locus 94. The predetermined distance k defines a chamfer amount in the chamfering and is appropriately set based on a desired chamfer amount.

According to the method of removing a burr of this embodiment as depicted in FIGS. 6 and 7, since the tree-shaped groove chamfering tool 70 is attached to the same cutting machine as the Christmas tree formed milling cutter 30 used in the cutting of the tree-shaped groove 52 to be machined and the chamfering of the end surface of the tree-shaped groove 52 is enabled by only changing the setting of the cutting machine, the method has an advantage that it is not necessary to provide a new machine for chamfering. The axial center movement locus 94 is uniquely defined by determining the predetermined distance k corresponding to the chamfer amount and the chamfer angle θ and, since the axial center movement locus 94 is a linear locus, anyone can set the locus without requiring skills, which realizes simple and uniform chamfering with machine operation. As a result, reduction of man-hours, shortening of working hours, and unmanned operation can be achieved with the simple and efficient chamfering.

A test conducted by the present inventor for verifying the effects of the present invention will be described. The present inventor conducted a cutting test for verifying the effects of the method of removing an end-surface burr of a formed groove and the formed rotary cutting tool for chamfering of the present invention under the following cutting test condition. Specifically, after cutting of a formed groove like the tree-shaped groove 52 by a rough cutter and a finishing cutter, a formed groove end surface is deburred (chamfered) with the method of removing an end-surface burr of the present invention described above by using a deburring cutter that is one embodiment of the formed rotary cutting tool for chamfering of the present invention.

[Cutting Test Condition]
Test Tool: Test Christmas Tree Formed Milling Cutters
  rough cutter (triple inverted-U shaped, about 22 mm φ in maximum diameter, about 6 mm φ in minimum diameter)
  finishing cutter (triple inverted-U shaped, about 22 mm φ in maximum diameter, about 6 mm φ in minimum diameter)
  deburring cutter (for chamfering at groove inclination angles α=0 degrees, 45 degrees)
Work Material: SS400 (ES standard)
Cutting fluid: water-immiscible cutting fluid (HS Type 2 Number 5)
Working Machine: vertical MIC
Cutting Rate: about 30 m/min
Feed Rate: about 30 mm/min (rough, finishing), about 50 mm/min (deburring)
Cutting Depth: about 30 mm
Deburring Tool Movement Length: about 8 mm (machining time: about 10 seconds)

Figure 8:
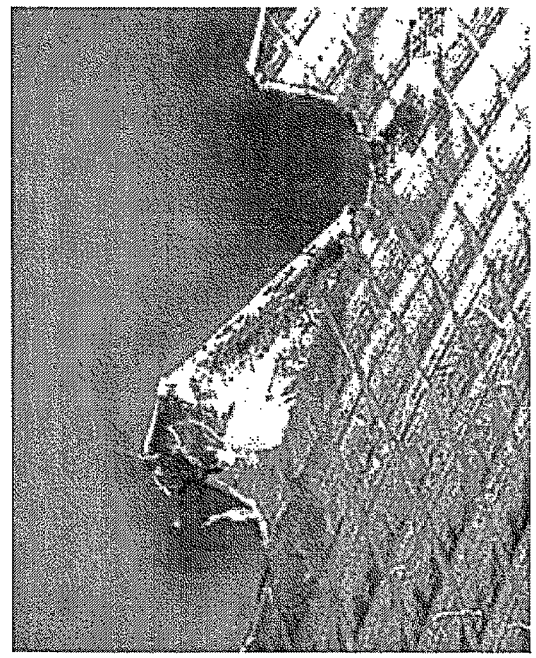
FIG. 8 depicts a photograph of an end surface of a formed groove cut in a cutting test conducted by the present inventor for verifying the effects of the present invention without deburring, and which is taken from the front side.
Figure 9:
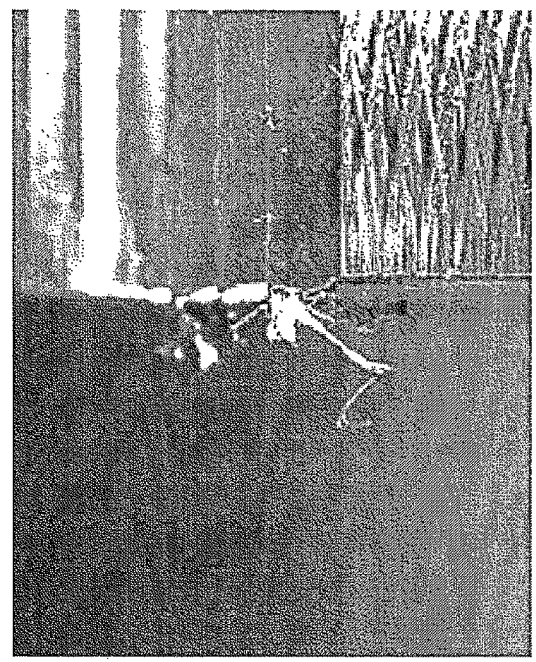
FIG. 9 depicts a photograph of the end surface of the formed groove cut in the cutting test conducted by the present inventor for verifying the effects of the present invention without deburring, and which is taken from the upper side.
Figure 10:
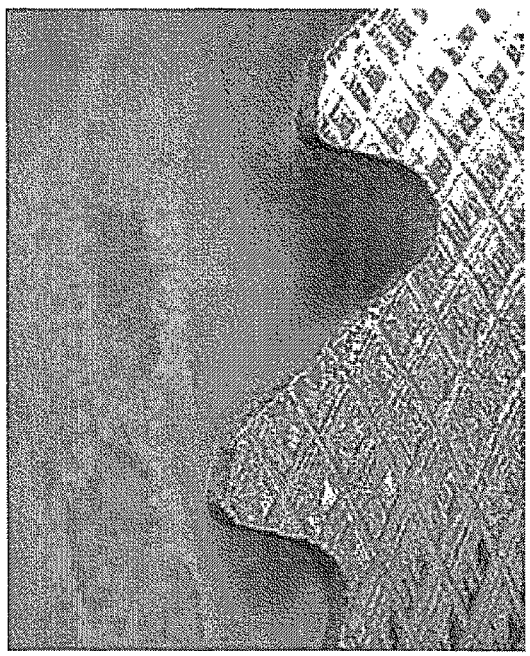
FIG. 10 depicts a photograph of an end surface of a formed groove after the end surface of the formed groove cut in the cutting test conducted by the present inventor for verifying the effects of the present invention is deburred by a deburring cutter with a chamfer amount of 0.5 mm, and which is taken from the front side.
Figure 11:
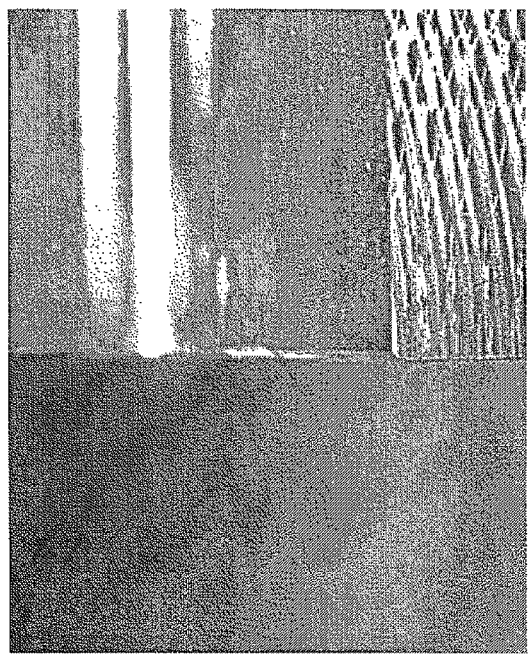
FIG. 11 depicts a photograph of the end surface of the formed groove after the end surface of the formed groove cut in the cutting test conducted by the present inventor for verifying the effects of the present invention is deburred by the deburring cutter with the chamfer amount of 0.5 mm, and which is taken from the upper side.
Figure 12:
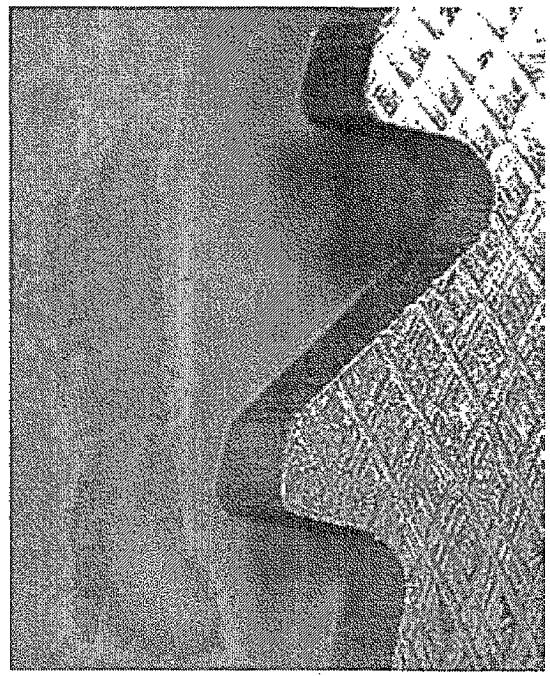
FIG. 12 depicts a photograph of an end surface of a formed groove after the end surface of the formed groove cut in the cutting test conducted by the present inventor for verifying the effects of the present invention is deburred by the deburring cutter with a chamfer amount of 1.5 mm, and which is taken from the front side.
Figure 13:
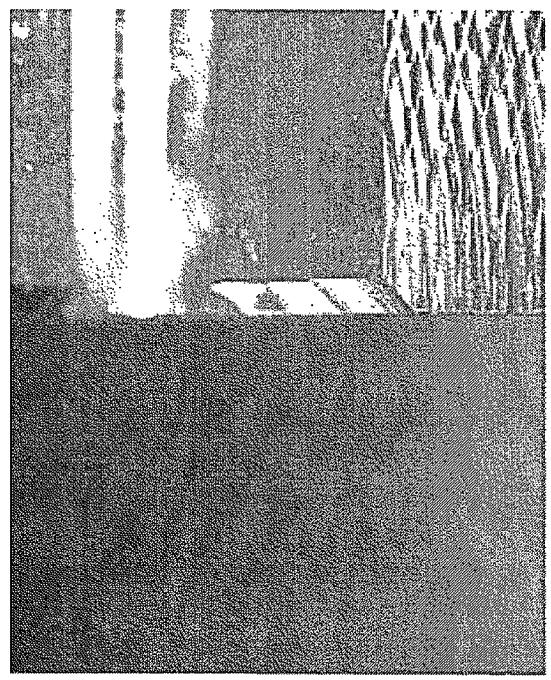
FIG. 13 depicts a photograph of the end surface of the formed groove after the end surface of the formed groove cut in the cutting test conducted by the present inventor for verifying the effects of the present invention is deburred by the deburring cutter with the chamfer amount of 1.5 mm, and which is taken from the upper side.
Figure 14:
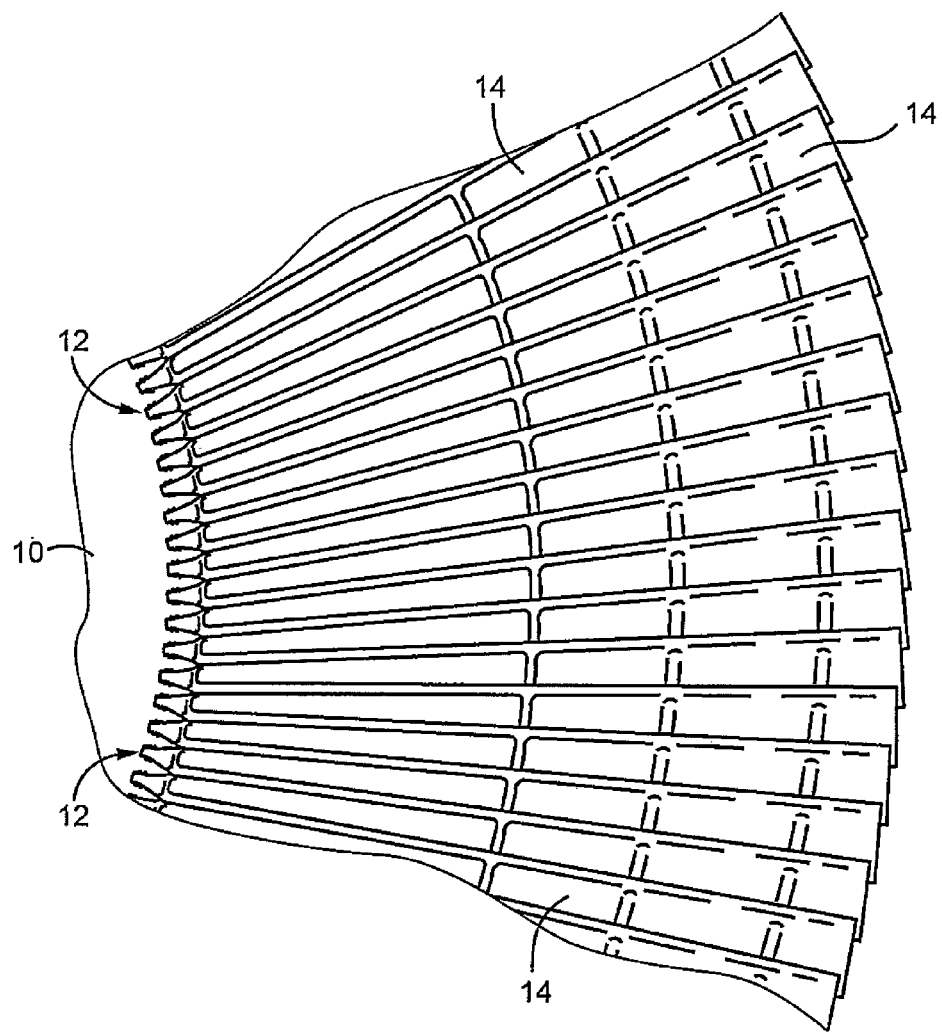
FIG. 14 is a view of a multiplicity of tree-shaped grooves for fitting blades of a turbine wheel.
Figure 15:
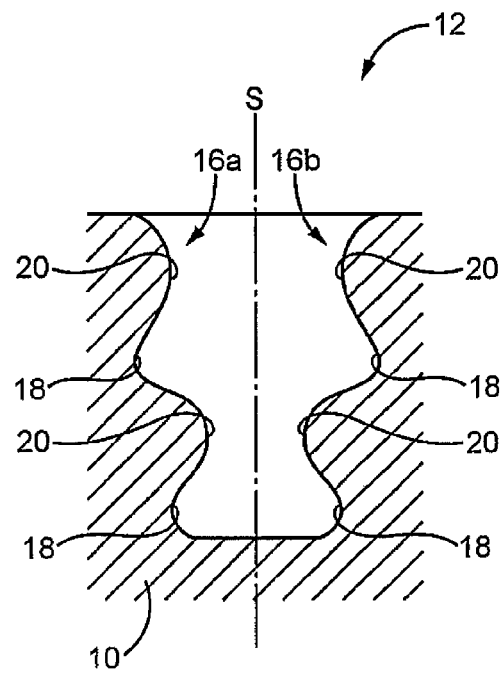
FIG. 15 is an enlarged cross-sectional view of the tree-shaped groove of FIG. 14.
Figure 16:
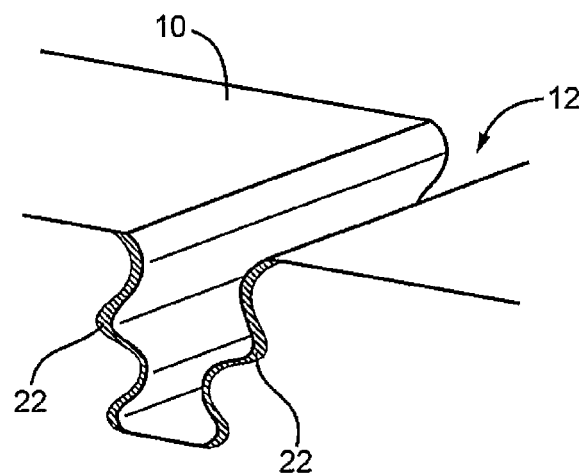
FIG. 16 is a view for explaining burrs generated on an end surface of the tree-shaped groove of FIG. 14.

FIGS. 8 and 9 depict photographs of an end surface of a formed groove cut by the rough cutter and the finishing cutter in the cutting test without deburring (chamfering), and FIG. 8 depicts a front photograph of the end surface taken from the front side while FIG. 9 depicts a plane photograph of the end surface taken from the upper side. As depicted in these photographs, the formed groove cut by the rough cutter and the finishing cutter has a burr generated on the end surface. FIGS. 10 and 11 depict photographs of an end surface of a formed groove after the end surface of the formed groove cut by the rough cutter and the finishing cutter in the cutting test is deburred (chamfered) by the deburring cutter with a chamfer amount (the distance k of the intersection point P from the end surface) of 0.5 mm, and FIG. 10 depicts a front photograph of the end surface taken from the front side while FIG. 11 depicts a plane photograph of the end surface taken from the upper side. FIGS. 12 and 13 depict photographs of an end surface of a formed groove after the end surface of the formed groove cut by the rough cutter and the finishing cutter in the cutting test is deburred (chamfered) by the deburring cutter with a chamfer amount (the distance k of the intersection point P from the end surface) of 1.5 mm, and FIG. 12 depicts a front photograph of the end surface taken from the front side while FIG. 13 depicts a plane photograph of the end surface taken from the upper side. As depicted in FIGS. 10 to 13, in the case of the formed groove deburred (chamfered) by using the deburred cutter that is one embodiment of the formed rotary cutting tool for chamfering of the present invention with the method of removing an end-surface burr of the present invention described above, it can be seen that the burr on the end surface is preferably removed.

As described above, according to this embodiment, chamfering for removing a burr on the end surface 90 is performed by using the tree-shaped groove chamfering tool 70 that is a formed rotary cutting tool for chamfering acquired by deforming the radial shape of the Christmas tree formed milling cutter 30 that is a formed rotary cutting tool used in cutting of a formed groove, i.e., the tree-shaped groove 52, in accordance with the predefined chamfer angle θ, and by rotationally driving around the axial center C and moving the tree-shaped groove chamfering tool 70 relative to the end surface 90 of the tree-shaped groove 52 in the direction orthogonal to the axial center C along the axial center movement locus 94 forming the chamfer angle θ relative to the axial center movement locus 92 of the Christmas tree formed milling cutter 30 in the cutting of the tree-shaped groove 52 and, therefore, the burr removal work can be mechanized while the standardized simple operation enables shortening of working hours and unmanned operation without requiring skills of workers. Thus, the method of removing an end-surface burr of a formed groove can be provided to realize uniform chamfering with a simple machine operation in a shorter time.

The tree-shaped groove chamfering tool 70 of this embodiment is acquired by deforming the radial shape of the Christmas tree formed milling cutter 30 used in the cutting of the tree-shaped groove 52, in accordance with the predefined chamfer angle θ and is used in the chamfering for removing a burr on the end surface 90 by rotationally driving around the axial center C and moving the tree-shaped groove chamfering tool 70 relative to the end surface 90 of the tree-shaped groove 52 in the direction perpendicular to the axial center C along the axial center movement locus 94 forming the chamfer angle θ relative to the axial center movement locus 92 of the Christmas tree formed milling cutter 30 in the cutting of the tree-shaped groove 52 and, therefore, the burr removal work can be mechanized by the same machine as the machine related to the cutting of the tree-shaped groove 52 while the standardized simple operation enables shortening of working hours and unmanned operation without requiring skills of workers. Thus, the tree-shaped groove chamfering tool 70 can be provided that realizes uniform chamfering with a simple machine operation in a shorter time.

The radial shape f(x) corresponding to the axial position x of the tree-shaped groove chamfering tool 70 is expressed by the equation (1), where $f_{base}(x)$ is a radial shape corresponding to the axial position x of the Christmas tree formed milling cutter 30 used in the cutting of the tree-shaped groove 52, θ is the chamfer angle, and α is an inclination angle of the extending direction of the tree-shaped groove 52 relative to the perpendicular line to the end surface 90; g(α,θ) in the equation (1) is expressed by the equation (2) if a portion to be chamfered is located on the acute angle side, and is expressed by the equation (3) if a portion to be chamfered is located on the obtuse angle side; and, therefore, the practical tree-shaped groove chamfering tool 70 preferably used for the end-surface burr removal work of the tree-shaped groove 52 can be provided.

Although the preferred embodiments of the present invention have been described in detail with reference to the drawings, the present invention is not limited to the embodiments and is implemented with various modifications without departing from the spirit thereof.

NOMENCLATURE OF ELEMENTS

10: rotating shaft 12: tree-shaped groove 14: blade 16: side surface 18: concave portion 20: convex portion 22: burr 30: Christmas tree formed milling cutter (formed rotary cutting tool) 32: shank 34: cutting portion 36: chip discharging groove 38: outer peripheral cutting edge 40: bottom cutting edge 42: first large diameter portion 44: first small diameter portion 46: second large diameter portion 48: second small diameter portion 50: workpiece 52: tree-shaped groove (formed groove) 54: side surface 56: first concave portion 58: first convex portion 60: second concave portion 62: second convex portion 70: tree-shaped groove chamfering tool (formed rotary cutting tool for chamfering) 72: shank 74: cutting portion 76: chip discharging groove 78: outer peripheral cutting edge 80: bottom cutting edge 82: first large diameter portion 84: first small diameter portion 86: second large diameter portion 88: second small diameter portion 90: end surface 92, 94: axial center movement locus a-d: radial dimensions, width dimensions $a_1$-$d_1$: radial dimensions C: axial center L: axial dimension S: groove center α: inclination angle of a groove direction θ: chamfer angle

The invention claimed is:

1. A method of removing an end-surface burr of a formed groove cut into a workpiece, comprising:
cutting the formed groove by rotationally driving around an axial center and moving a formed rotary cutting tool relative to the workpiece in a direction orthogonal to the axial center, and
rotationally driving around an axial center and moving a formed rotary cutting tool for chamfering relative to an end surface of the formed groove in a direction perpendicular to the axial center along an axial center movement locus forming the chamfer angle relative to an axial center movement locus of the formed rotary cutting tool in the cutting of the formed groove, thereby performing chamfering for removing a burr on the end surface,
wherein the formed rotary cutting tool for chamfering is acquired by deforming a radial shape of the formed rotary cutting tool used in cutting of the formed groove in accordance with a predefined chamfer angle, and
wherein a radial shape f(x) corresponding to an axial position x of the formed rotary cutting tool for chamfering is expressed by $$f(x)=f_{base}(x)\times\cos\theta\times g(\alpha,\theta)$$

wherein $f_{base}(x)$ is a radial shape corresponding to the axial position x of the formed rotary cutting tool used in the cutting of the formed groove, θ is the chamfer angle, and α is an inclination angle of the formed groove direction relative to a perpendicular line to the end surface, wherein if a portion to be chamfered is located on an acute angle side,
$g(\alpha,\theta)=1+\tan\alpha\times\tan\theta$ is satisfied, and wherein
if a portion to be chamfered is located on an obtuse angle side,
$g(\alpha,\theta)=1\cdot\tan\alpha\times\tan\theta$ is satisfied.

2. A set of two cutting tools comprising:
a formed rotary cutting tool used for cutting a formed groove into a workpiece, and
a formed rotary cutting tool for chamfering used for removing an end-surface burr of the formed groove cut into the workpiece,
wherein the formed rotary cutting tool for chamfering is acquired by deforming a radial shape of the formed rotary cutting tool used in cutting of the formed groove in accordance with a predefined chamfer angle, and
wherein a radial shape f(x) corresponding to an axial position x of the formed rotary cutting tool for chamfering is expressed by $$f(x)=f_{base}(x)\times\cos\theta\times g(\alpha,\theta)$$

wherein $f_{base}(x)$ is a radial shape corresponding to the axial position x of the formed rotary cutting tool used in the cutting of the formed groove, θ is the chamfer angle, and α is an inclination angle of the formed groove direction relative to a perpendicular line to the end surface, wherein if a portion to be chamfered is located on an acute angle side,
$g(\alpha,\theta)=1+\tan\alpha\times\tan\theta$ is satisfied, and wherein
if a portion to be chamfered is located on an obtuse angle side,
$g(\alpha,\theta)=1\cdot\tan\alpha\times\tan\theta$ is satisfied.

3. The set of the two cutting tools of claim 2, wherein a cutting portion of the formed rotary cutting tool for chamfering is smaller in a diameter in the axial position x than a cutting portion of the formed rotary cutting tool.

* * * * *